Figure 2:
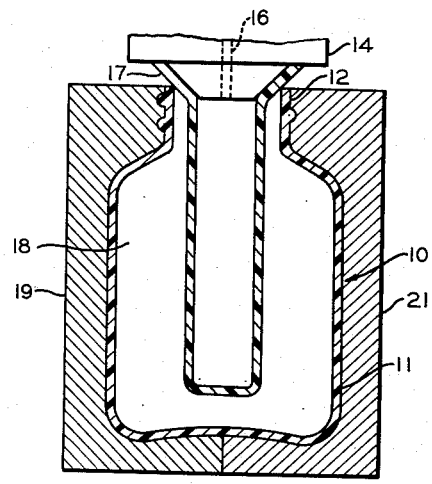

Dec. 10, 1963  H. D. COALE  3,113,831
METHOD OF FORMING A DOUBLE-WALLED CONTAINER
Filed Jan. 26, 1961

INVENTOR.
H. D. COALE
BY Hudson & Young
ATTORNEYS though slight, does contribute to a noticeable lessening of the shrinkage rate of the thermoplastic container. As the extruded parison cools and shrinks, the trapped air in annulus 18 is further compressed thus assuring a continuous, positive pressure on the parison exterior. The positive pressure of the trapped air opposes the natural shrinkage of the cooling thermoplastic of the parison, so that the inner container is maintained in spaced relationship with the outer container in part by the air cushion so provided.

United States Patent Office 3,113,831

Patented Dec. 10, 1963

3,113,831
METHOD OF FORMING A DOUBLE-WALLED CONTAINER
Harold D. Coale, Bartlesville, Okla., assignor to Phillips Petroleum Company, a corporation of Delaware
Filed Jan. 26, 1961, Ser. No. 85,031
4 Claims. (Cl. 18—59)

This invention relates to the simplified construction of a thermoplastic double-walled container. In another aspect it relates to a thermoplastic double-walled container having improved heat insulating properties by incorporating an insulating liner therein.

Double-walled containers have long been utilized because of their excellent insulating properties. Most commonly, such containers comprise an outer container wall disposed about an inner container wall. The necessary spaced relationship being maintained by projections on the inner container, or a retaining form for the inner container may determine the limits of its expansion so that it will not contact and fuse with the outer wall during construction. However, the manufacture of double-walled containers as disclosed in the prior art is complicated and inevitably rather expensive because of the need for these special spacing elements.

I have discovered a method of utilizing in part the superior insulating properties of certain polyolefins, such as high density polyethylene, to provide a double-walled container having the internal spacing required for insulation, but without the need for forms, projections, or spacers to maintain the inner and outer container walls apart. I also novelly utilize the air that is trapped and compressed between the two walls which acts as a low heat transfer cushion therebetween, to augment the effect of the outer wall's insulating property on the cooling and shrinking rate of the blown inner wall.

Accordingly, it is an object of this invention to provide a simplified and economical construction for a double-walled container to be used for heat insulating purposes.

It is another object to provide a double-walled container wherein the inner wall is maintained in spaced relationship with the outer wall by the differential shrinkage rate of the two walls and the retained air cushion compressed between the inner and outer walls.

Still another object of this invention is to provide an economical method for fabricating a thermoplastic double-walled container.

Yet another object of this invention is to provide a double-walled container incorporating an insulating liner between the walls thereof that results in superior insulating properties.

Various other objects, advantages and features of this invention will be apparent to those skilled in the art without departing from the spirit and scope of this invention and it should be understood that the latter is not necesarily limited to the aforementioned discussion.

Broadly, the invention comprises forming a thermoplastic outer container wall by conventional molding and first allowing the same to cool, then positioning the cooled outer container in a holder such as a mold, positioning a parison which is closed off at the first inserted end and of an expandable thermoplastic material within said outer container through an initially open end thereof, expanding the parison by applying fluid under pressure to the interior thereof, concurrently further expanding the open end portion of said expanding parison into frictional and sealing engagement with the open end of the outer container thereby sealing off the annulus, limiting the outward movement of the expanding parison by maintaining the air initially disposed between the inner surface of the outer wall and the outer surface of said parison trapped therebetween, thereby forming a cushion of compressed air in the resulting annulus. In this manner the expanded parison forms an inner container of similar configuration to and in closely spaced relation with the outer container resulting in an insulating annulus therebetween.

In another embodiment, the method of construction is the same except that prior to the insertion of the parison, the outer container is lined with an impervious sheet, or a porous cloth, of flexible insulating material. This liner remains completely sealed within the annulus of the completed double-walled container, providing insulating properties superior to that achievable without the insulating liner.

Figure 1:
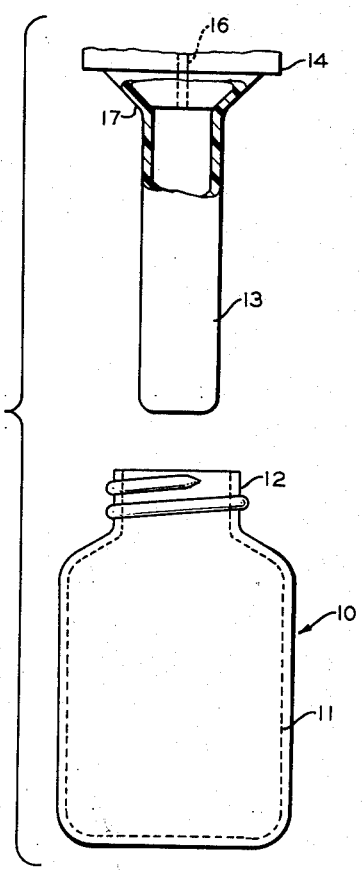

A more complete understanding of the invention may be had by reference to the accompanying drawing, wherein like parts have ben designated with like reference numerals, of which FIGURE 1 is an elevation of certain component parts used in the simplified forming of the double-walled container.

Figure 3:
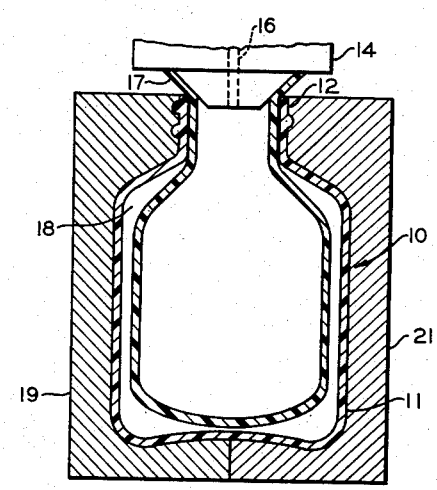
Figure 4:
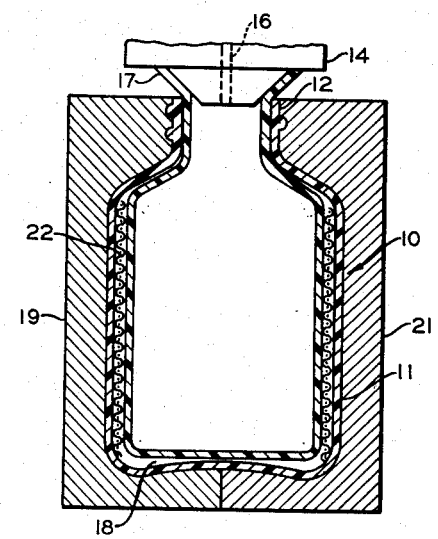

FIGURES 2 and 3 are elevational views in full section of an apparatus for performing the simplified method, showing the parison in the initial and final steps; and FIGURE 4 is an elevational view in full section, of a lined, double-walled container, illustrating the second embodiment of this invention.

Referring to FIGURE 1, a conventionally formed, molded thermoplastic container, generally designated 10, is employed as the outer wall of the double-walled container which is to be formed. Container 10 is conventionally formed with a body portion 11 and a narrowed mouth or open end 12. The body portion 11 may have a diameter larger, smaller, or approximately the same as its open end 12. Container 10 may be made of any thermoplastic, form-retaining material, such as high density polyethylene, conventional polyethylene, or other solid polymers of aliphatic mono-1-olefins. Other resins, such as polystyrene and polyvinylchloride, and even glass may be successfully employed in this invention. As shown in the drawing, outer container 10 is made of a thermoplastic.

The inner container is formed by inserting a bubble-like or tubular mass, pinched off at the lower end, commonly called a parison 13, through the open end 12 of preformed container 10, and expanding said parison by applying fluid under pressure, as is well known in the art, for example, through a blow-head 14, to the interior of parison 13.

The method of forming the double-walled container is described as follows in connection with FIGURES 2 and 3. The parison 13 of expandable material is inserted through the open end 12 of container 10. It is disposed in spaced relationship with the inner surface of outer container 10, making contact therewith only at the open end. Next, parison 13 is expanded by applying fluid under pressure to the interior thereof, by means of passage 16 within blowhead 14. The outward movement of the parison is limited in part by maintaining trapped in the annulus the air initially disposed between the inner surface of outer container 10 and the outer surface of the parison 13. This is achieved by concurrently further expanding the open end 17 of the parison into sealing engagement with the open end 12 of outer container 10 in order to seal off the annulus 18 between the walls. Because the extruded, molten parison 13 is still quite hot, it fuses permanently with the open end portion of outer container 10, and thus becomes physically bonded thereto. Additionally, the insulating properties of the outer container result in a slower cooling rate for the expanding parison. This is explained by the poorer heat transfer from the parison through the outer container to the walls of the mold cavity, composed of mold halves 19 and 21. The slower cooling rate, in turn, results in a greater shrinkage of the internal container, which insures retaining the air gap between the walls necessary for good heat insulation.

The resulting double-walled container includes an inner container in closely spaced relationship with the outer container, and with the mouth 17 contiguous with the mouth 12 of the outer container, thereby forming a sealed air space between the inner and outer containers. It is apparent that the inner container generally has a lesser cross-sectional area than the outer container, except in the area where they are physically bonded to one another, and the cross-sectional areas must necessarily coincide. Nevertheless, a storage volume close to that of the outer container can be realized.

In FIGURE 4 is shown a double-walled container incorporating an insulating liner as the alternate embodiment of this invention. The method of construction of the alternate embodiment is the same as described in connection with FIGURES 1–3, except for the addition of one step. After outer container 10 is formed, it is lined with an impervious sheet, or a porous cloth, of a flexible insulating material 22. Then, blowing and sealing of the inner container from parison 13 proceeds as previously described, with the liner being completely sealed within annulus 18 of the finished double-walled container. The presence of this insulating liner provides even greater insulating properties than achievable without the insulating liner. The choice, of course, will turn on whether the additional insulating-effect achieved with the liner is economically justifiable in view of the added cost of the liner itself.

The process of the present invention is preferably applicable to substantially all of the thermoplastic normally solid polymers and resins, such as the polyolefins, and especially high density polyethylene. In general, any solid polymer of an aliphatic mono-1-olefin can be used within the scope of this invention. Example of such starting materials include polymers and copolymers of aliphatic mono-1-olefins, such as ethylene, propylene, butene-1, hexene-1, octene-1, and the like. Polymers of aliphatic mono-1-olefins having a maximum of 8 carbon atoms per molecule and no branching nearer the double bond than the fourth position provide thermoplastic containers having particularly desirable properties, such as thermal insulation, which increases the shrinkage rate of the blown inner wall. Homopolymers and copolymers, as well as mixtures of homopolymers and copolymers are suitable polymeric materials for the articles of the invention.

The polyolefins, especially polyethylenes, that can be employed in the practice of the present invention can be prepared by any of the methods which are usually employed for the preparation of these polymers. The high density polyolefins prepared by the low pressure processes now known are useful in the preparation of the container type articles of the invention. However, the invention is also applicable to the lower density polyolefins as well.

Resins suitable for extrusion or blow molding in accordance with the invention are the high density polyolefins made in accordance with the Hogan and Banks Patent No. 2,825,712, issued March 4, 1958. This family of polyolefins are of higher density than ordinary high pressure polyolefins. To illustrate, polyethylene of this type has a density of 0.960–0.980, as compared with high pressure polyethylenes which has a density of about 0.920. Even when copolymerized with minor amounts of other olefins, such as 1-butene, the density of the ethylene copolymer is above 0.940. However, as noted, the invention is applicable to all types of extrudable and moldable thermoplastic resins.

The liner employed as an optional insulating material comprises a sheet of a flexible material, such as vulcanized natural or butyl rubber, or a similar impervious membrane. Also, suitable in this application is a woven fabric of plastic filaments which possess heat insulating properties. Exemplary of a fabric woven from monofilaments of normally solid polymer or resin is one disclosed in the copending application of Anthony Bottomley, Serial No. 40,349, filed July 1, 1960. Also, a cloth woven of glass fibers furnishes a highly desirable insulating liner.

Certain modifications of the invention will become apparent to those skilled in the art without departing from the spirit and scope of this invention.

I claim:

1. A method of forming a double-walled, open-end, blown container comprising the steps of: forming an outer container wall by molding; inserting a parison of an expandable thermoplastic material into said outer container through the open end thereof; expanding said parison by applying fluid under pressure to the interior thereof; concurrently further expanding the open end portion of said expanding parison into sealing engagement with the open end of said outer container so as to limit the outward movement of the expanding parison by maintaining the air initially disposed between the inner surface of said outer wall and the outer surface of said parison trapped therebetween, whereby said expanded parison forms an inner container of similar configuration to and in closely spaced relation with said outer container.

2. The method according to claim 1 wherein said thermoplastic comprises a polymer of at least one aliphatic mono-1-olefin having a maximum of 8 carbon atoms per molecule and no branching nearer the double bond than the 4-position.

3. A method of forming a double-walled, open-end, blown container comprising the steps of: forming a thermoplastic outer container wall by conventional blow molding, lining said outer container with a sheet of flexible insulating material; inserting a parison of an expandable thermoplastic material into said outer container through the open end thereof; expanding said parison by applying fluid under pressure to the interior thereof; further expanding the open end portion of said expanding parison into sealing engagement with the open end of said outer container so as to limit the outward movement of the expanding parison by maintaining the air initially disposed between the inner surface of said outer wall and the outer surface of said parison trapped therebetween, whereby said expanded parison forms an inner container of similar configuration to and in closely spaced relation with said outer container.

4. The method according to claim 3 wherein said flexible insulating material is selected from the group consisting of a rubber sheet, woven plastic, monofilaments and a glass fiber cloth.

References Cited in the file of this patent

UNITED STATES PATENTS

| | | |
|---|---|---|
| 1,127,381 | Byrnes | Feb. 2, 1915 |
| 2,805,787 | Sherman | Sept. 10, 1957 |
| 2,837,232 | Rossi | June 3, 1958 |
| 2,951,264 | Bailey | Sept. 6, 1960 |
| 2,981,430 | Tsien et al. | Apr. 25, 1961 |
| 3,002,646 | Lewis | Oct. 3, 1961 |
| 3,023,461 | Sherman | Mar. 6, 1962 |